United States Patent Office 3,134,500
Patented May 26, 1964

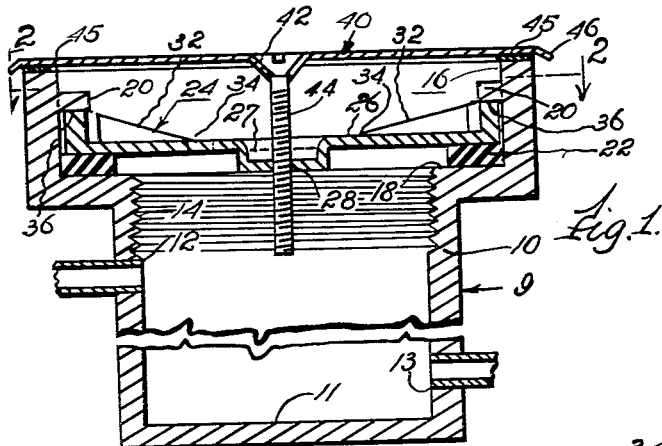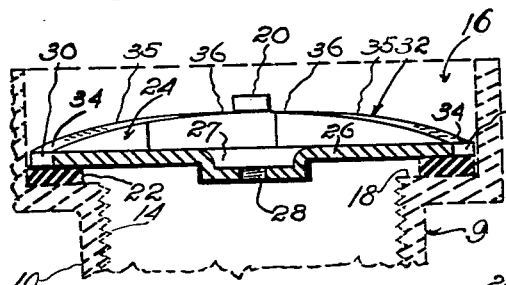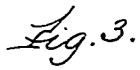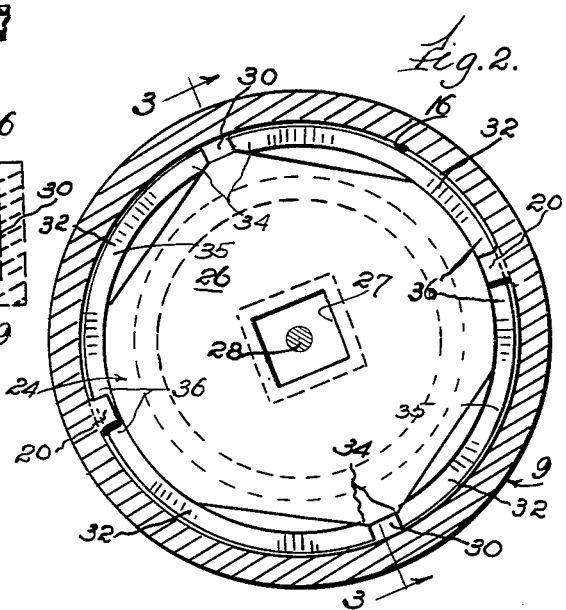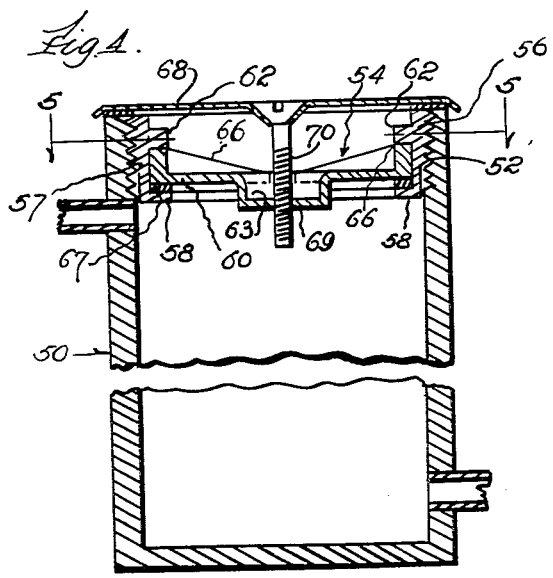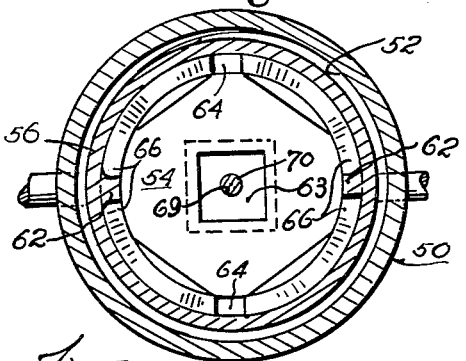

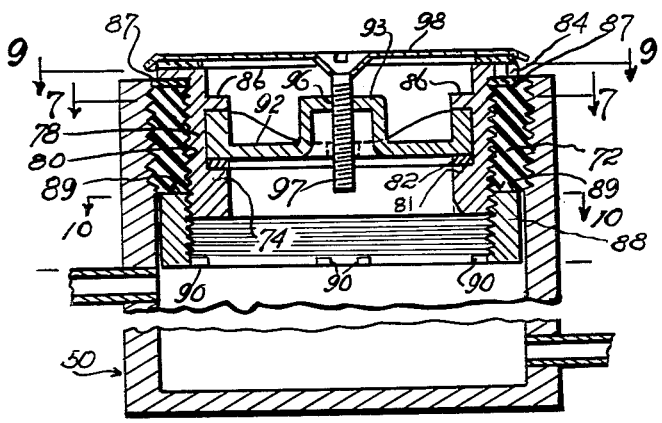
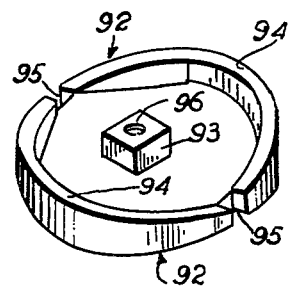
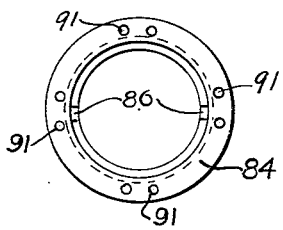
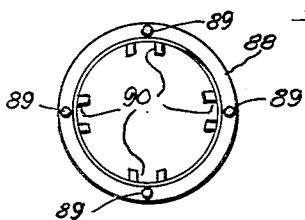

3,134,500
CLOSURE MEANS AND ALSO TO MEANS FOR SECURING A DRUM TRAP COVER TO THE DRUM TRAP
Louis A. Kirschner, 6740 N. Sheridan Road, Chicago, Ill., and Leon I. Kirschner, 7650 Lavergne Ave., Skokie, Ill.
Filed Oct. 23, 1962, Ser. No. 232,512
13 Claims. (Cl. 220—25)

This invention relates to improvements in closure means and also to means for securing a drum trap cover to the drum trap.

One of the objects of this invention is to provide improved means for securing a drum trap cover to a drum trap.

In conventional practice, the drum trap cover is secured to a threaded plug which is in threaded engagement with the threaded drum trap. In the course of time, the threads of the plug and drum trap become rusty and the screw plug becomes locked to the trap, making it impossible or difficult to remove, and requiring considerable physical effort and special tools to effect removal. Therefore, the object of this invention is to provide means wherein the drum trap cover may be secured to the drum trap, yet is not subject to the hazards described in connection with threaded engaging members. This invention permits a ready securement and ready detachment of the drum trap cover with respect to the drum trap.

Another object of this invention is to provide a closure means which may be used in lieu of conventional closures or plugs in plumbing fixtures and the like.

Other objects and advantages will become apparent as this description progresses.

In the drawings, the invention is illustrated with particular reference to a drum trap, yet it will be understood that it may be used as a substitute for other closures or plugs in other structures not herein illustrated.

In the drawings:

FIG. 1 is a central vertical section of one embodiment of this invention, showing the drum trap, the drum trap cover, and the means to which the drum trap cover is secured.

FIG. 2 is a top plan view taken on lines 2—2 of FIG. 1.

FIG. 3 is a sectional view taken on lines 3—3 of FIG. 2.

FIG. 4 is a central vertical section of a modification.

FIG. 5 is a top plan view taken on lines 4—4 of FIG. 4.

FIG. 6 is a central vertical section of another modification.

FIG. 7 is a sectional view taken on lines 7—7 of FIG. 6.

FIG. 8 is a perspective view of the inner closure or cap shown in FIGS. 6 and 7.

FIG. 9 is a reduced plan view taken on lines 9—9 of FIG. 6, and

FIG. 10 is a reduced plan view taken on lines 10—10 of FIG. 6.

Reference will be made first to the embodiment shown in FIGS. 1, 2 and 3.

The drum trap, generally designated by the numeral 9, has a cylindrical shaped body 10 and a bottom 11. The body 9 has openings 12 and 13 at different elevations, the upper opening 12 being connected to a pipe which forms the outlet to the trap, and the lower opening 13 being connected to another pipe forming the inlet. The upper portion of the cylindrical body is internally threaded as at 14.

The cylindrical body 10 has an enlarged cylindrical upper end or mouth 16 of greater diameter than the diameter of the body 10 and an annular horizontally extending shoulder 18. Extending inwardly of the enlarged cylindrical upper end or mouth 16 and below the top thereof are two lugs 20 which are diametrically oppositely positioned and which may be integrally formed with the drum trap, such as when same is cast, or the lugs may be inwardly extending pins secured to the drum trap. The lugs 20 are the means to which the inner closure member is secured. Positioned on the annular shoulder is an annular ring or gasket 22 made of resilient material.

An inner closure member or cap, generally designated by the numeral 24, is provided with a horizontally extending wall 26 having a centrally positioned depressed portion 27 which is generally square-shaped in plan. The center of the depressed portion 27 has an internally threaded opening 28. The inner closure 24 is provided with a pair of diametrically oppositely positioned cutouts 30.

The upper surface of the inner closure member has a pair of cam-shaped members generally indicated at 32, which are diametrically oppositely positioned. Each cam member 32 starts at the low point 34 from adjacent the opposite cutouts 30 and slopes or inclines upwardly as at 35 to the high spots 36. The cam members are adjacent the perimeter of the inner closure. Reference can be had to FIG. 8 for a perspective view of similar cam members on a modified inner closure member or cap.

Referring again to FIGS. 1 to 3 inclusive, the inner closure member or cap 24 is inserted inside the mouth 16 of the drum trap and the cutouts 30 thereof are alined to register with the lugs 20 to permit the inner closure or cap to pass between the lugs 20, after which the inner closure or cap 24 is rotated in either direction and the camming surfaces will engage the underside of the lugs to lock the inner closure or cap to said lugs, as shown in FIG. 1, when the high points 36 of the cams are in locking engagement with the lugs. The inner closure 24 is thus secured to the drum trap. A tool may be inserted in the depressed portion 27 for rotating the inner closure 24.

The drum trap cover, generally indicated at 40, is provided with a central countersunk opening 42 which receives the head of a threaded bolt 44. The threaded bolt is in threaded engagement with the central threaded opening 28 of the inner closure 24. This secures the cover 40 to the inner closure 24. A resilient ring 45 is positioned on the top of the drum trap and engages the outer cover 40. The peripheral edge of the drum trap cover is shaped to form a beveled edge 46 overhanging the edge of the drum trap. The drum trap cover is flush with the floor surface. From the position shown in FIG. 1, the drum trap cover 40 may be readily removed by unthreading the bolt 44 from the inner closure 24 to expose the inner closure 24.

The inner closure or cap may be disengaged from the drum trap by rotating said inner closure in the reverse direction from that previously descibed so that the high points 36 of the camming members 32 disengage from the inwardly extending lugs 20. Registering the cutouts 30 of the inner closure with the lugs 20 will permit the inner closure to be lifted and removed from the drum trap.

With this construction, threaded engagements which would heretofore rust and become locked together are eliminated and there is provided a very simple and efficient structure which overcomes the objections of prior structures.

The structure disclosed in FIGS. 4 and 5 will now be described.

FIGS. 4 and 5 show a construction attachable to conventional drum traps. The conventional drum trap designated by the numeral 50 is internally threaded at the upper end or mouth thereof as at 52. Threadedly secured thereto is an adapter generally indicated at 54 which has an annular body or ring portion 56 externally threaded as at 57 for engagement with the internal threads 52 of the drum trap. The annular body is provided with an annular inwardly extending lip 58 at the lower end thereof on which the inner closure generally indicated at 60 is positioned. The adapter 54 is also provided with a pair of inwardly extending lugs 62 which are diametrically oppositely positioned, similar to the lugs described in connection with the structure of FIG. 1. They likewise serve the same purpose. The lugs 62 are positioned inwardly of the top of the adapter as in the structure of FIG. 1.

The inner closure member or cap 60 is of the same construction as that shown in FIG. 1, except that it is of smaller diameter, and will not be specifically described in detail. The inner closure or cap 60 has a pair of diametrically oppositely positioned cutouts 64, a pair of cam-shaped members 66 diametrically oppositely positioned, similar in all respects to the cam members 32. It is also provided with a central square-shaped recess or depressed portion 63 to accommodate a tool. The inner closure 60 is secured to the adapter 54 when the cam members 66 engage the inwardly extending lugs 62, as previously described. A resilient ring or gasket 67 is interposed between the lip 58 and the adapter 54.

The drum trap cover 68 is similar in construction to the drum trap cover 40 previously described, except that it is of smaller diameter, and is secured to the threaded opening 69 of the adapter by a threaded bolt 70, similar to that previously described.

The difference between the structure shown in FIGS. 4 and 5 and that shown in FIGS. 1 to 3 inclusive, is that in the FIG. 4 structure an adapter is attached to the conventional drum trap so that same may be converted for use with this invention. In the structure shown in FIGS. 1–3, the drum trap is modified at the upper end or mouth and is used essentially in new installations of drum traps, whereas the FIG. 4 structure is adapted for use in existing drum traps. Also, the adapter type shown in FIG. 4 may be used if the lugs 20, shown in the FIGS. 1–3 construction should break. In that event the adapter 54 is secured to the threads 14 of the drum trap 9 shown in FIG. 1, and the drum trap cover 40 is used to cover the top of said drum trap, and the longer threaded member 44 is secured to the inner closure or cap 60 shown in FIG. 4.

Reference will now be made to the structure shown in FIGS. 6 to 10 inclusive.

In this modification an enlarged rubber or resilient ring 72 surrounds the adapter generally indicated at 74, and is adapted to be compressed to lock the adapter to the drum trap which is generally indicated at 76. The conventional drum trap 76 is internally threaded as at 77 at the upper end or mouth. The adapter 74 has a cylindrical body portion 78 which is externally threaded as at 80. It has an inwardly extending annular shoulder 81 at the lower end and an outwardly extending annular flange 84 at the upper end thereof. A rubber gasket 82 is supported on shoulder 81.

Extending inwardly below the top of the adapter are a pair of diametrically oppositely positioned lugs 86, similar to the lugs 62 of the FIG. 4 structure previously described. The enlarged cylindrical shaped resilient member 72 formed of rubber or the like is positioned around the exterior of the adapter 74 and has a tight fit therewith so that the rubber or resilient material engages the external threads of the adapter. It does not extend the full length of the adapter 74.

A metal ring 87 is positioned between the upper end of the resilient member 72 and the outwardly extending flange 84 of the adapter 74. An internally threaded metal ring or coupling member 88 is threadedly secured to the lower end of the adapter. The lower ring or coupling member 88 is provided with spaced upwardly extending projections 89 at the top thereof which extend into the resilient member 72. The ring or coupling member 88 has a plurality of equally spaced pairs of inwardly extending projections 90, best shown in FIGS. 6 and 10, which are adapted to be engaged by a suitable tool inserted through the top or mouth of the drum trap for holding the ring or coupling member 88 stationary against rotation while the adapter 74 is rotated into a tighter engagement with the ring or coupling member 88 to narrow the space therebetween and thereby compress the resilient ring 72. It will be understood that the resilient member 72 and the metal ring or coupling member 88 is secured in threaded engagement to the adapter 74 before the adapter is inserted into the upper end of the drum trap. However, when inserted it is not secured tightly and the resilient ring 72 is not compressed.

After the adapter is inserted in the drum trap, the resilient member 72 is adapted to be compressed between the drum trap and the adapter to lock the adapter to the drum trap. The compression of the resilient member 72 is accomplished by rotating the adapter 74 with respect to the ring or coupling member 88 while holding the coupling stationary by a tool, as previously described. This reduces the space occupied by the resilient member 72 and compresses it between the threaded portion of the drum trap and the adapter 74 for locking the adapter to the drum trap. For the purpose of facilitating rotation of the adapter 74 with respect to the ring or coupling member 88, the top surface of the flange 84 of the adapter 74 is provided with spaced holes 91, best seen in FIGS. 6 and 9, which are engaged by a tool manually held and rotated.

The inner closure or cap generally indicated at 92, which is secured to the adapter is shown in perspective in FIG. 8 and said inner closure is substantially like the inner closures or caps previously described, except for the central portion of said closure which has a raised square-shaped center 93 instead of a depressed center as previously described. The raised portion 93 is engageable by a tool for rotating the inner closure or cap 92. The inner closure or cap 92 has oppositely positioned cam members 94 and a pair of diametrically opposed cutouts 95, all of which are identical to those previously described. The central raised square-shaped portion 93 is provided with a central internally threaded opening 96 to receive the threaded bolt 97 which is attached to the drum trap cover 98, as previously described.

The inner closure or cap 92 is locked into engagement with the inwardly extending lugs 86 by rotating same in either direction so that the high points of the cam surfaces engage with the lugs.

It will be understood that in all the embodiments shown, the drum trap covers must be first moved before access can be gained to the inner closures or caps.

This invention also has application to other structures, other than drum traps, which employ closure plugs. This invention may be used in lieu of the closure plugs in such structures as test T's, Y cleanouts, iron body ferrules, and other devices of like character. Wherever this invention is used in connection with such devices, the cap or inner closure member and the fitting or means to which same is secured, as herein described, is substituted for such closure plugs. In such cases, covers like the drum trap covers and the threaded means for holding the drum trap covers, as herein described, are eliminated as they are not essential with test T's and the like.

It will be understood that various changes and modifications may be made from the foregoing without departing from the spirit and scope of the appended claims.

What is claimed is:

1. Means for securing a drum trap cover to a drum trap having a body and an enlarged cylindrical mouth extending upwardly of the body and defining a shoulder therebetween and having a pair of oppositely positioned inwardly extending locking projections in said mouth below the top thereof, said means including a cap adapted to extend across and within the mouth of the drum trap and below the top thereof and adapted to rest on the shoulder, said cap having a pair of diametrically oppositely positioned slots adapted to be alined with said inwardly extending locking projections when said cap is positioned in said drum trap, a pair of oppositely positioned camming members on said cap and extending upwardly of the top of said cap, each said camming member starting from adjacent the opposite slot and sloping upwardly whereby each camming member engages one of said locking projections upon a slight rotation of said cap, a drum trap cover positioned over the top of said drum trap and in spaced relation to said cap, and connecting means between said drum trap cover and said cap for securing said drum trap cover to said drum trap.

2. In a structure defined in claim 1 in which the cap has an internally threaded opening and the connecting means for securing the drum trap cover to said cap comprises a threaded member in engagement with said internally threaded opening.

3. Means for securing a drum trap cover to a drum trap having a mouth at its upper end and a plurality of inwardly extending locking projections extending into the mouth below the top of said mouth and an inwardly extending shoulder below said inwardly extending locking projections, said means including an inner closure member adapted to be supported on said shoulder, said inner closure member having a plurality of recesses adapted to aline with the plurality of inwardly extending locking projections to permit said inner closure to be inserted inside the mouth of said drum trap so as to rest on said shoulder, said inner closure having a plurality of camming members on the top thereof and extending upwardly of the top of said inner closure and adapted for locking engagement with said locking projections upon rotation of said inner closure member, a drum trap cover adapted to extend over the mouth of said drum trap and in spaced relation to said inner closure, and means between said drum trap cover and said inner closure for securing said drum trap cover in secured position over said mouth.

4. In a structure defined in claim 3 in which the inner closure has a threaded opening and the means for securing said drum trap cover to said inner closure member comprises a threaded member secured to the drum trap and in threaded engagement with the threaded opening.

5. Means for securing a drum trap cover to a drum trap having an internally threaded portion adjacent the upper end thereof, a fitting having external threads adapted to be secured in threaded engagement with said threads of said drum trap, said fitting having an inwardly extending flange at the lower end thereof, said fitting having a plurality of inwardly extending locking projections, an inner closure having a plurality of recesses adapted to register with said inwardly extending locking projections whereby said inner closure is inserted into said drum trap to be positioned and rest on said inwardly extending flange of said fitting, said inner closure having a plurality of camming members for engagement with said inwardly projecting locking projections upon rotation of said inner closure member, a drum trap cover positioned to extend over the top of said fitting, and means for securing said drum trap cover to said inner closure.

6. A structure defined in claim 5 in which the inner closure is provided with a central threaded opening, and the means for securing said drum trap cover to said inner closure comprises a threaded member in engagement with said drum trap cover and in threaded engagement with said threaded opening.

7. A structure defined in claim 5 in which there is a pair of diametrically oppositely positioned locking projections on the fitting and a pair of similarly positioned recesses on the inner closure, and a pair of oppositely positioned camming members on the inner closure, with each camming member starting from adjacent the opposite recesses and sloping inwardly to a high point, whereby each camming member engages one of said locking projections upon a slight rotation of said inner closure.

8. A structure of the character described comprising a fitting, means for securing said fitting to the upper end of a drum trap, said fitting having an inwardly extending shoulder and a pair of diametrically oppositely positioned locking projections extending above said shoulder and in spaced relation thereto, an inner closure having a pair of oppositely positioned cutouts adapted to register with said locking projections to permit said inner closure to be inserted inside said fitting and to rest on said shoulder, said inner closure having a pair of oppositely positioned camming members each adapted to engage with said locking projections upon a slight rotation of said inner closure, a drum trap cover positioned over said inner closure, and means between said drum trap cover and said inner closure to secure said drum trap cover to said inner closure.

9. In a structure defined in claim 8 in which the inner closure has an opening and a member is secured to said drum trap cover and to said opening to secure the drum trap cover to said inner closure.

10. A structure defined in claim 8 in which the means for securing said fitting to said drum trap includes a compressible resilient member.

11. A structure defined in claim 8 in which the means for securing said fitting to said drum trap includes a resilient ring supported between the opposite ends of said fitting, and means at one of said ends for rotation so that said resilient ring is compressed between said fitting and said drum trap.

12. A structure for securement to a drum trap, said structure comprising a fitting, a resilient ring surrounding said fitting, a ring in threaded engagement with said fitting and adapted to be rotated relative thereto to compress said resilient ring to expand it laterally so that said resilient ring locks said fitting to said drum trap, said fitting having a plurality of inwardly extending locking projections adjacent the upper end of said fitting, said fitting having a shoulder below said locking projections, an inner closure having a plurality of slots adapted to register with said projections to permit said inner closure to be inserted inside said fitting and on said shoulder, said inner closure having a plurality of camming members for engagement with said inwardly extending locking projections upon a slight rotation of said inner closure, a drum trap cover, and means secured to and extending between said drum trap cover and said inner closure for securing said drum trap cover to said inner closure.

13. A structure for securement to a plumbing fixture, said structure comprising a fitting, a resilient ring surrounding said fitting, a ring in threaded engagement with said fitting and adapted to be rotated relative thereto to compress said resilient ring to expand it laterally so that said resilient ring locks said fitting to said plumbing fixture, said fitting having a plurality of inwardly extending locking projections adjacent the upper end of said fitting, said fitting having a shoulder below said locking projections, an inner closure having a plurality of slots adapted to register with said projections to permit said inner closure to be inserted inside said fitting and on said shoulder, said inner closure having a plurality of camming members for engagement with said inwardly extending locking projections upon a slight rotation of said inner closure.

References Cited in the file of this patent

UNITED STATES PATENTS

| 1,239,704 | Sims | Sept. 11, 1917 |
| 2,366,975 | McChesney | Jan. 9, 1945 |
| 2,735,572 | Getz | Feb. 21, 1956 |
| 2,805,099 | Bailey | Sept. 3, 1957 |

FOREIGN PATENTS

| 512,069 | France | Oct. 4, 1920 |